US012678271B2

(12) United States Patent
Nishio et al.

(10) Patent No.: US 12,678,271 B2
(45) Date of Patent: Jul. 14, 2026

(54) TOOTH WHITENING AND TOOTH STRENGTHENING METHOD

(71) Applicant: Nishio Co., Ltd., Chiba (JP)

(72) Inventors: Hidetoshi Nishio, Chiba (JP); Naoko Miki, Tokyo (JP)

(73) Assignee: Nishio Co., Ltd., Chiba (JP)

( * ) Notice: Subject to any disclaimer, the term of this patent is extended or adjusted under 35 U.S.C. 154(b) by 503 days.

(21) Appl. No.: 17/916,254

(22) PCT Filed: Mar. 30, 2021

(86) PCT No.: PCT/JP2021/013639
§ 371 (c)(1),
(2) Date: Sep. 30, 2022

(87) PCT Pub. No.: WO2021/201004
PCT Pub. Date: Oct. 7, 2021

(65) Prior Publication Data
US 2023/0240824 A1 Aug. 3, 2023

(30) Foreign Application Priority Data

Mar. 30, 2020 (JP) ................................. 2020-061676
Apr. 1, 2020 (JP) ................................. 2020-066330

(51) Int. Cl.
*A61C 19/06* (2006.01)
(52) U.S. Cl.
CPC .................................. *A61C 19/066* (2013.01)
(58) Field of Classification Search
CPC ..... A61C 19/066; A61C 19/06; A61C 19/063; A61C 8/0006; A61C 17/227
(Continued)

(56) References Cited

U.S. PATENT DOCUMENTS 5,409,631 A * 4/1995 Fischer .................... A61K 8/42
252/186.28
5,855,870 A * 1/1999 Fischer .................... A61K 8/42
424/53
(Continued)

FOREIGN PATENT DOCUMENTS

JP 56-73015 A 6/1981
JP 3-68442 A 3/1991
(Continued)

OTHER PUBLICATIONS

International Search Report, Japan Patent Office, Jun. 1, 2021.
Written Opinion International Searching Authority, Jun. 1, 2021.
Hydroxyapataito as a Medical Savior by Aoki Hideki.

*Primary Examiner* — Matthew M Nelson
(74) *Attorney, Agent, or Firm* — Bay State IP, LLC

(57) ABSTRACT

A tooth whitening and tooth strengthening method is disclosed which is harmless to the human body and with which it is possible to remove dental plaques, tartars, coloring components and organic pellicles, promote calcification, repair the surface of teeth by reconstruction of enamel, whiten teeth and prevent caries.

The tooth whitening and tooth strengthening method first applies acid solvents such as citric acid, acetic acid, malic acid, malic acid or ascorbic acid with a pH of 0.5 to 5.0. to the surface of teeth as a first stage of treatment, applies hydroxyapatite which is dissolved in saliva or saliva-like solvent as a second stage, and then applies fluoride as a third stage.

2 Claims, 3 Drawing Sheets

BEFORE APPLICATION
(a)

5 MINUTES AFTER TOOTH SURFACE APPLICATION OF CITRIC ACID OF pH 2.5
(b)

(58) Field of Classification Search
USPC ......................................................... 433/215
See application file for complete search history.

(56) References Cited

U.S. PATENT DOCUMENTS

| | | | | |
|---|---|---|---|---|
| 6,306,370 B1 * | 10/2001 | Jensen | ...................... | A61K 8/22 |
| | | | | 424/53 |
| 2007/0160958 A1 * | 7/2007 | Belikov | ............... | A61C 19/066 |
| | | | | 433/215 |
| 2008/0280260 A1 * | 11/2008 | Belikov | ............... | A46B 11/002 |
| | | | | 433/32 |
| 2010/0021867 A1 * | 1/2010 | Altshuler | ................. | A61K 6/77 |
| | | | | 433/215 |
| 2013/0064778 A1 * | 3/2013 | Riina | ................... | A61K 31/375 |
| | | | | 424/48 |
| 2018/0125626 A1 * | 5/2018 | Groves | .................... | A61K 8/24 |
| 2019/0083220 A1 * | 3/2019 | Wlaschin | ............... | A61K 8/731 |
| 2019/0175956 A1 * | 6/2019 | Dolezal | ................... | A61K 8/99 |

FOREIGN PATENT DOCUMENTS

| | | | |
|---|---|---|---|
| JP | 8-143436 | A | 6/1996 |
| JP | 2002-167318 | A | 6/2002 |
| JP | 2005-47903 | A | 2/2005 |
| JP | 2005-139201 | A | 6/2005 |
| JP | 2007-504186 | A | 3/2007 |
| JP | 2008-231032 | A | 10/2008 |
| JP | 2009-528352 | A | 8/2009 |
| JP | 2017-48162 | A | 3/2017 |

* cited by examiner

BEFORE APPLICATION (a)

5 MINUITES AFTER TOOTH SURFACE APPLICATION OF CITRIC ACID OF ph 2.5

(b)

CONTROL(BEFORE APPLICATION)

(a)

TOOTH SURFACE 5 MINUITES AFTER HYDROXYAPATITE PARTICLES ARE APPLIED (b)

BEFORE APPLICATION (a)

1 MINUTE AFTER APPLICATION OF 9,000 ppm SODIUM FLUORIDE (b)

TOOTH WHITENING AND TOOTH STRENGTHENING METHOD

CROSS REFERENCE TO RELATED APPLICATION

This application is for entry into the U.S. National Phase from which priority is claimed under all applicable sections of Title 35 of the United States Code including, but not limited to, Sections 120, 363, and 365 (c) to International Application No. PCT/JP2021/013639 filed on Mar. 30, 2021, and which in turn claims priority under 35 USC 119 to Japanese Patent Application No. 2020-061676 filed on Mar. 30, 2020 and Japanese Patent Application No. 2020-066330 filed on Apr. 1, 2020.

TECHNICAL FIELD

The present invention relates to a tooth whitening and tooth strengthening method. More specifically, it relates to a tooth whitening and tooth strengthening method that combines tooth whitening method using hydroxyapatite and tooth strengthening method using fluoride, after treating the surface of teeth with acid.

BACKGROUND ART

There have been toothpastes or tooth powders containing hydroxyapatite or high concentration fluoride. However, there has been no tooth whitening and tooth strengthening method that can improve both whiteness and strength of the surface of teeth, repair and calcify the surface of teeth, efficiently increasing the tooth components by applying acid solvent as a pretreatment under unusual conditions, using hydroxyapatite, and then applying fluoride to the surface of teeth as a posttreatment.

Patent Document 1 discloses a tooth whitening method using whitening agent containing fluoride. While the tooth whitening agent containing fluoride is effective in coating teeth, there were some worries in cleaning and rinsing teeth with toothpastes and rinses, since the harmfulness to the human body when absorbed mucosally through soft tissues has not been fully elucidated.

Non-patent document 1 relates to hydroxyapatite, and is a background of whitening agent used in the present invention, which describes properties of hydroxyapatite, an effect of saliva and so on. However, the tooth whitening agent used in the present invention is not explained in this document.

RELATED ART DOCUMENT

Patent Document

[Patent Document 1] Japanese Unexamined Patent Application Publication No. 2015-221814

Non-Patent Document

[Non-patent Document 1] AOKI Hideki (2019.03.06). *Hydroxyapataito as a Medical Savior*, Goen Tosho.

DISCLOSURE OF THE INVENTION

Problems to be Solved by the Invention

In the conventional tooth whitening methods using hydrogen peroxide and urea peroxide, $H_2O_2$ is decomposed into water $H_2O$ and carbon dioxide $CO_2$ by bonding with the tooth enamel, decolorizing the surface of teeth. However, there was a problem that it also demineralized and dehydrated the surface of teeth, weakening the tooth structure.

As for toothpastes, most are pH-adjusted to be slightly alkaline. It is true that they are quite effective against plaques and tartars that can be removed with alkalinity, but leave plaques and tartars that are difficult to be removed without acidity. Conventional toothpastes are either abrasive, weakly acidic or alkaline, and even acidic ones with a pH of 4 or higher have difficulty removing stubborn plaques and tartars. Moreover, there is a thin organic film called "Pellicle" on the surface of teeth, which can cause teeth to yellow by taking in protein-based coloring components. In addition to plaques and tartars, this pellicle prevents the effectiveness of the tooth whitening method using hydrogen peroxide and urea peroxide.

Conventional toothpastes and mouthwashes with hydroxyapatite crystals as an ingredient dissolve apatite crystals in aqueous solution, so the dissociation rate of the crystalline structure of apatite crystals is low and the effect of remineralization on the surface of teeth cannot be enhanced. In addition, stubborn plaques, tartars and a thin organic film pellicle that cannot be removed by conventional tooth cleaning, inhibit apatite bonding to the surface of teeth.

"Fluoride treatment" has been another conventional tooth strengthening method. Tooth enamel is composed of 97% hydroxyapatite, 2% organic matter and 1% water, and the maturity levels in the hydroxyapatite crystals vary, and a wide variety of lattice defects exist. Hydroxyapatite changes its composition to become fluoroapatite when exposed to fluorine. Then its morphology as a tissue shrinks and the strength of its crystal structure is increased, making it more durable to acids. Therefore, it has been used as a tooth strengthening method to prevent teeth from dissolving when exposed to cavity acid. In recent years, however, it has been discovered that regular use of fluorine can cause many harmful systemic symptoms, such as IQ reduction, induction of autism, and atopic dermatitis.

In addition, since there is a thin organic film called "Pellicle" on the surface of teeth which causes teeth to yellow by taking in protein-based coloring components, it is necessary to strengthen teeth by removing coloring components and pellicle to repair and remineralize the tooth structure without causing harmful systematic symptoms when performing conventional "fluoride treatment" that directly applies fluoride to the surface of teeth. For this purpose, toothpastes or mouthwashes containing fluoride are not used because of their absorption action from the oral mucosa, but are applied only to the surface of teeth and wiped off without touching the mucosa. The leftovers from daily meals and brushing also cover the surface of the teeth with multiple layers of stains. Since people are to apply fluoride on top of the stains, the effectiveness of fluoride treatment is reduced.

The present invention has been made in view of the above problems, and an object thereof is to provide the tooth whitening and tooth strengthening method that divides the chemical reactions on the surface of teeth into a three-stage time sequence and performs them sequentially, thereby enhancing the synergistic effects of whitening, restoration, remineralization, and strengthening of enamels on the surface of teeth, rather than performing each individually.

Means of Solving the Problems

The tooth whitening and tooth strengthening method according to the present invention removes plaques, tartars, coloring components and pellicle from the surface of teeth by applying acid solvents such as citric acid, acetic acid, malic acid, malic acid or ascorbic acid with a pH of 0.5 to 5.0, as a first stage of treatment. A second stage is to apply hydroxyapatite which is dissolved in saliva or saliva-like solvent to the surface of teeth, and a third stage is to apply fluoride to the surface of teeth. By performing these three stages of treatment sequentially, it is possible to remove stains and organic protein pellicles from the surface of teeth, repair and calcify the tooth components efficiently, and increase strength of the surface of teeth by improving both whiteness and acid resistance.

In other words, the present invention resides in the following 1 to 3:

1. Removing plaques, tartars, coloring components and pellicle from surface of teeth by applying acid solvents such as citric acid, acetic acid, malic acid, malic acid or ascorbic acid with a pH of 0.5 to 5.0.

2. Applying hydroxyapatite which is a bond of calcium, calcium phosphate and hydroxide ions, with a particle size of 4 nm to 1.7 mm, dissolved in saliva or saliva-like solvent to surface of teeth. This effectively binds to the enamel apatite that makes up the surface of teeth, thereby accelerating remineralization.

3. Applying fluoride to calcium phosphate (apatite) which is a component of surface of teeth to bind it. This increases acid resistance and strength of the surface of teeth by forming calcium fluorophosphate (fluorapatite) and shrinking the enamel apatite crystals on surface of teeth.

The present invention uses citric acid, hydrochloric acid, acetic acid, malic acid, and ascorbic acid with a pH of 0.5 to 5.0 to remove a thin organic film, "Pellicle", as well as to bleach and clean the surface of teeth. In addition, not aqueous solution but saliva or saliva-like solvent is used for dissolving nano-sized hydroxyapatite powder to promote the dissociative action of the apatite crystal structure, $Ca10$ $(PO4)6(OH)2$.

By applying a solvent with a high dissociation rate of apatite crystals dissolved in saliva or saliva-like solution to surface of teeth, which promotes the dissociative action of the apatite crystal structure $Ca10(PO4)6(OH)2$ and binds to the enamel (calcium phosphate) on the surface of teeth, the tooth structure can be strengthened by thickening the enamel (calcium phosphate), without damaging the tooth structure, and also the unevenness of the surface of teeth can be restored, causing a whitening effect the same time.

Effects of the Invention

The tooth whitening and tooth strengthening method in the present invention first involves pretreatment to remove coloring components and pellicle from the surface of teeth by applying acid solvents such as citric acid, acetic acid, malic acid, malic acid or ascorbic acid with a pH of 0.5 to 5.0. Then, hydroxyapatite which is dissolved in saliva or saliva-like solvent is used to efficiently mineralize, restore and strengthen the surface of teeth before fluoride is applied to improve acid resistance and strength and whiteness of the tooth. These three stages of treatment performed in sequence strengthen the enamel on the surface of teeth by crystallization of hydroxyapatite and enhance the bonding of the crystal structure by fluorine bonding in enamel. In this way, the tooth whitening of higher whiteness, restoration of enamel apatite crystal, remineralization and strengthening the tooth structure can be realized.

MODE FOR CARRYING OUT THE INVENTION

Hereinafter, the tooth whitening and tooth strengthening method will be described. However, the present invention is not limited to the embodiments described below.

In the present invention, as a first stage of treatment for the tooth whitening and tooth strengthening method, plaques, tartars, coloring components and pellicle are removed from the surface of teeth by applying acid solvents such as citric acid, acetic acid, malic acid, malic acid or ascorbic acid with a pH of 0.5 to 5.0. A second stage is to apply hydroxyapatite which is dissolved in saliva or saliva-like solvent to the surface of teeth to efficiently calcify, repair and strengthen surface of teeth. In addition, fluoride is applied as well to improve acid resistance and strength and whiteness of the tooth, as a third stage. These three stages enable to strengthen the enamel on the surface of teeth by crystallization of hydroxyapatite, then to enhance the bonding of the crystal structure by fluorine bonding in enamel, realizing tooth whitening of higher whiteness, restoration of enamel apatite crystal, remineralization and strengthening the tooth structure.

Acid

The acids used in the tooth whitening and tooth strengthening method in the present invention are not limited to those that are not harmful to the human body when used on the oral mucosa.

The acids used in the present invention are citric acid, acetic acid, malic acid, malic acid or ascorbic acid with a pH of 0.5 to 5.0.

Hydroxyapatite Particles

The tooth whitening and tooth strengthening method in the present invention uses a solvent that dissolved hydroxyapatite with an average particle diameter 4 nm to 1.7 mm, which is smaller particle size than usual, in saliva or saliva-like solvent.

Fluoride

The fluoride used in the tooth whitening and tooth strengthening method in the present invention are fluoride sodium fluoride, calcium fluoride, and monotin fluoride with 500 ppm to 100,000 ppm.

First Embodiment

Figure 1:
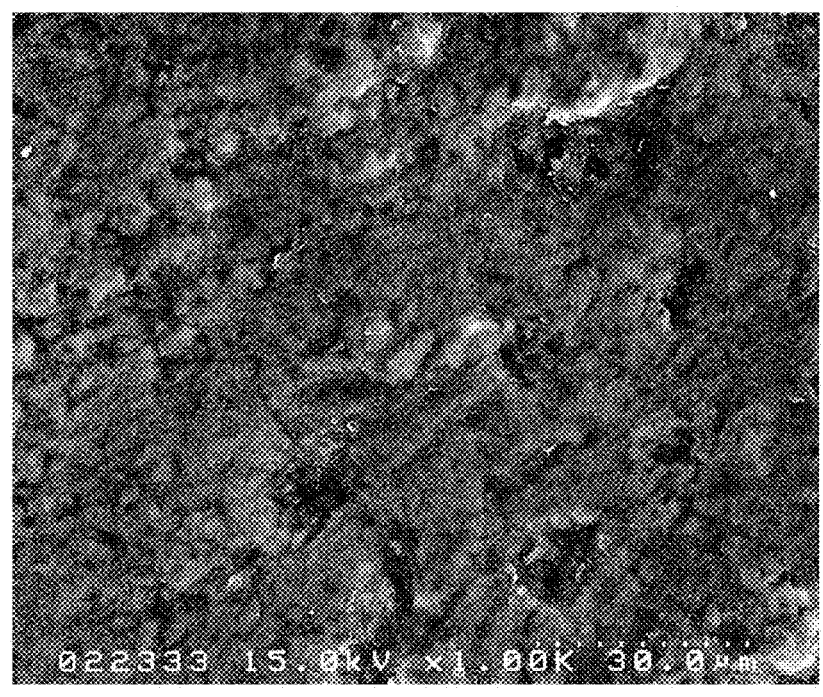
FIG. 1 is photographic images explaining the effect of applying citric acid with a pH2.5 to the surface of teeth.
Figure 1:
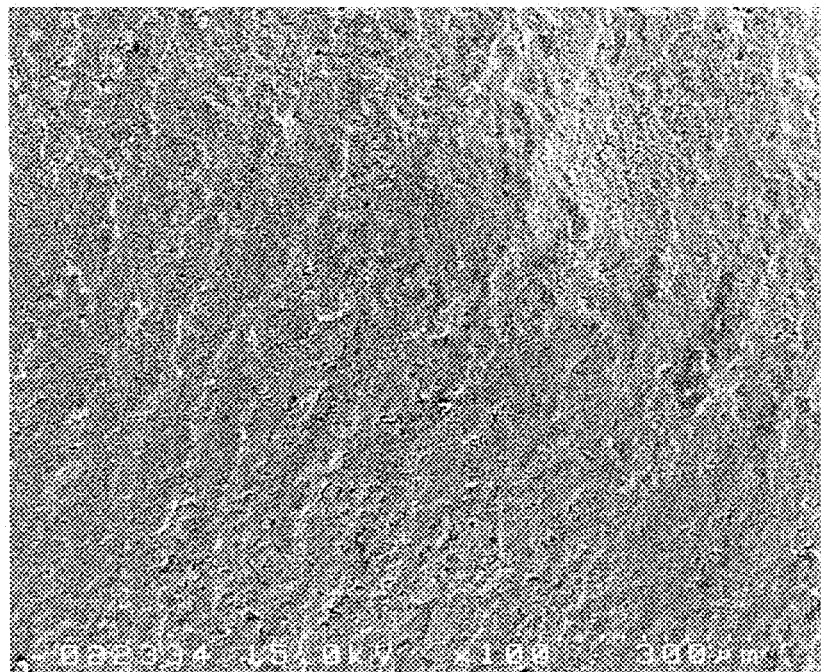

FIG. 1 explains the embodiment of removing plaques, tartars and pellicle by using citric acid with a pH2.5. FIG. 1(*a*) shows the surface of teeth before pH2.5 citric acid is applied and FIG. 1(*b*) shows the surface of teeth 5 minutes later. As shown in FIG. 1, plaques, tartars and pellicle attached to the surface of teeth can be removed by applying pH2.5 citric acid.

Figure 2:
FIG. 2 is photographic images explaining the effect of applying hydroxyapatite powder of 4 nm to 1.7 mm dissolved in saliva or saliva-like solvent to the surface of teeth.
Figure 2:
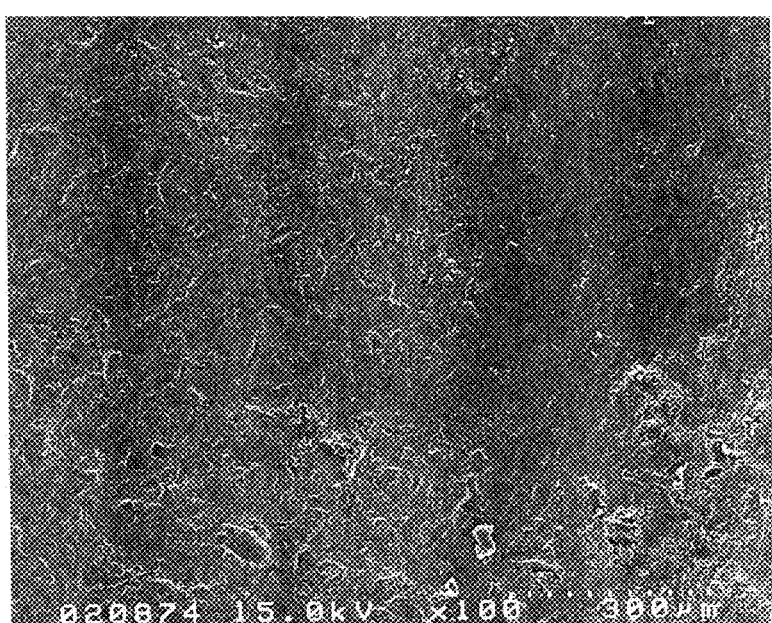

FIG. 2 shows that hydroxyapatite particles of 4 nm to 1.7 mm dissolved in saliva or saliva-like solvent binds to the apatite that makes up the surface of teeth, resulting in restoration of the surface of teeth and apatite reconstruction, when applied to the surface of teeth. FIG. 2(*a*) shows the surface of teeth before application of hydroxyapatite particles and FIG. 2(*b*) shows the surface of teeth 5 minutes later. It can be seen in the FIG. 2 that it binds to the apatite that makes up the surface of teeth and realizes tooth restoration and apatite reconstruction.

Figure 3:
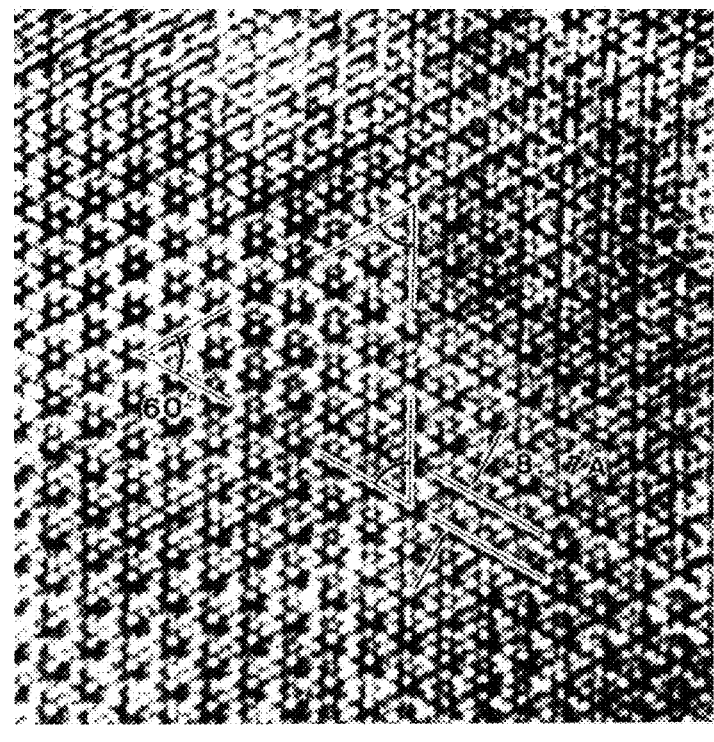
FIG. 3 is photographic images explaining the effect of applying 9,000 ppm sodium fluoride to the surface of teeth.
Figure 3:
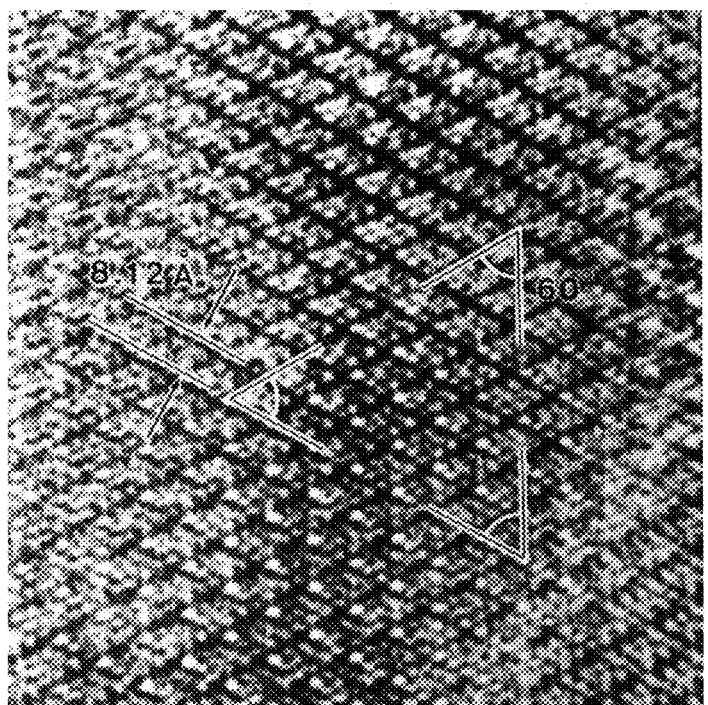

FIG. 3 shows that sodium fluoride with 500 ppm to 100,000 ppm applied to the surface of teeth strengthens the tooth structure due to shrinkage of the enamel apatite crystals. FIG. 3(*a*) shows the surface of teeth before application and FIG. 3(*b*) shows the surface of teeth one minute later. As can be seen in the FIG. 3, sodium fluoride shrinks the apatite crystal: from 8.17 atto (1 mm of 10,000,000,000, 000,000) before application to 8.12 atto (after application).

INDUSTRIAL APPLICABILITY

According to the tooth whitening and tooth strengthening method in the present invention, tooth strengthening method which includes cosmetic tooth whitening can be provided. Therefore, the present invention can be used not only for medical applications, but also as a tooth whitening and tooth strengthening method performed for cosmetic purposes in non-medical whitening salons, dental offices and the like.

The invention claimed is:

1. A tooth whitening and strengthening method with a hydroxyapatite solution comprising the following three stages of treatment performed in sequences:
   applying acid solvents to surface of teeth so as to remove coloring components and pellicle from the surface of teeth as a first stage;
   applying the hydroxyapatite solution to the surface of teeth so as to efficiently calcify tooth components on the surface of teeth from which coloring components and pellicle were removed in the first stage, restore and strengthen the surface of teeth as a second stage; and
   applying fluoride to the surface of teeth on which tooth components were calcified in the second stage to improve strength of the surface of teeth by enhancing acid resistance and whiteness of the tooth as a third stage,
   wherein the acid solvents being pH of 0.5 to 5.0 acid solvents and including citric acid are prepared prior to the treatment;
   wherein the hydroxyapatite solution is prepared prior to the treatment by dissolving hydroxyapatite in saliva or saliva-like solvent.

2. The tooth whitening and tooth strengthening method according to claim 1,
   wherein the acid solvents further include at least any of citric acid, acetic acid, malic acid, malic acid or ascorbic acid.

\* \* \* \* \*